March 5, 1957 H. P. G. A. R. VON ZBOROWSKI 2,783,613
COOLING SYSTEM EMPLOYING FUEL FOR COOLING
THE BLADES OF GAS TURBINE ENGINES
Filed Aug. 18, 1951 2 Sheets-Sheet 1
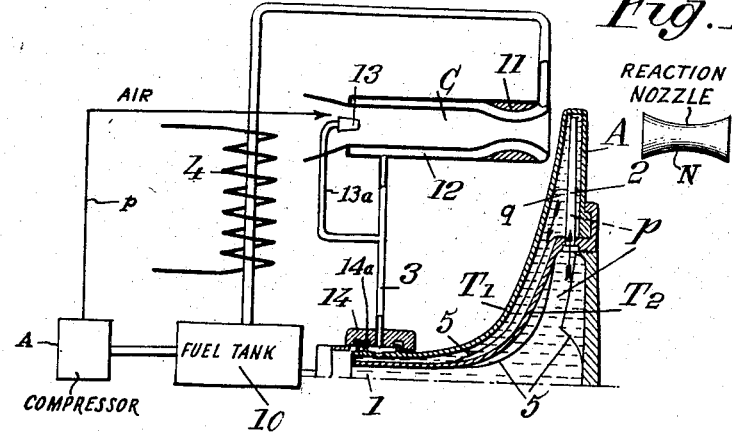
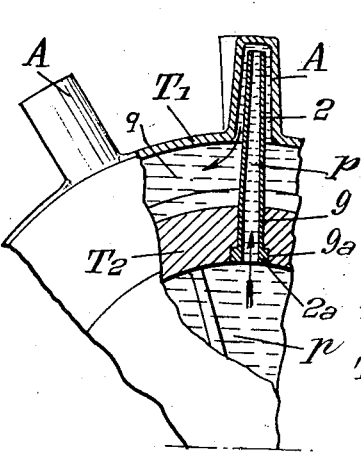
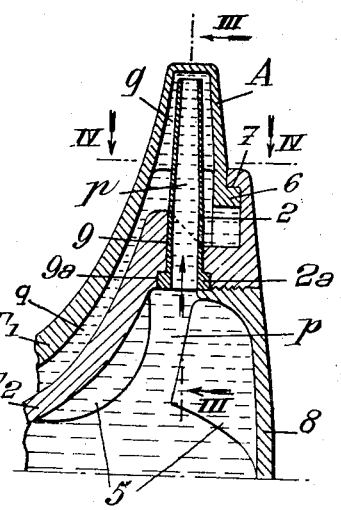
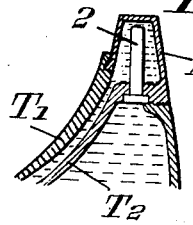
INVENTOR:
HELMUT PH. G.A.R. VON ZBOROWSKI
BY
Richardson, David and Nordon
ATTORNEYS

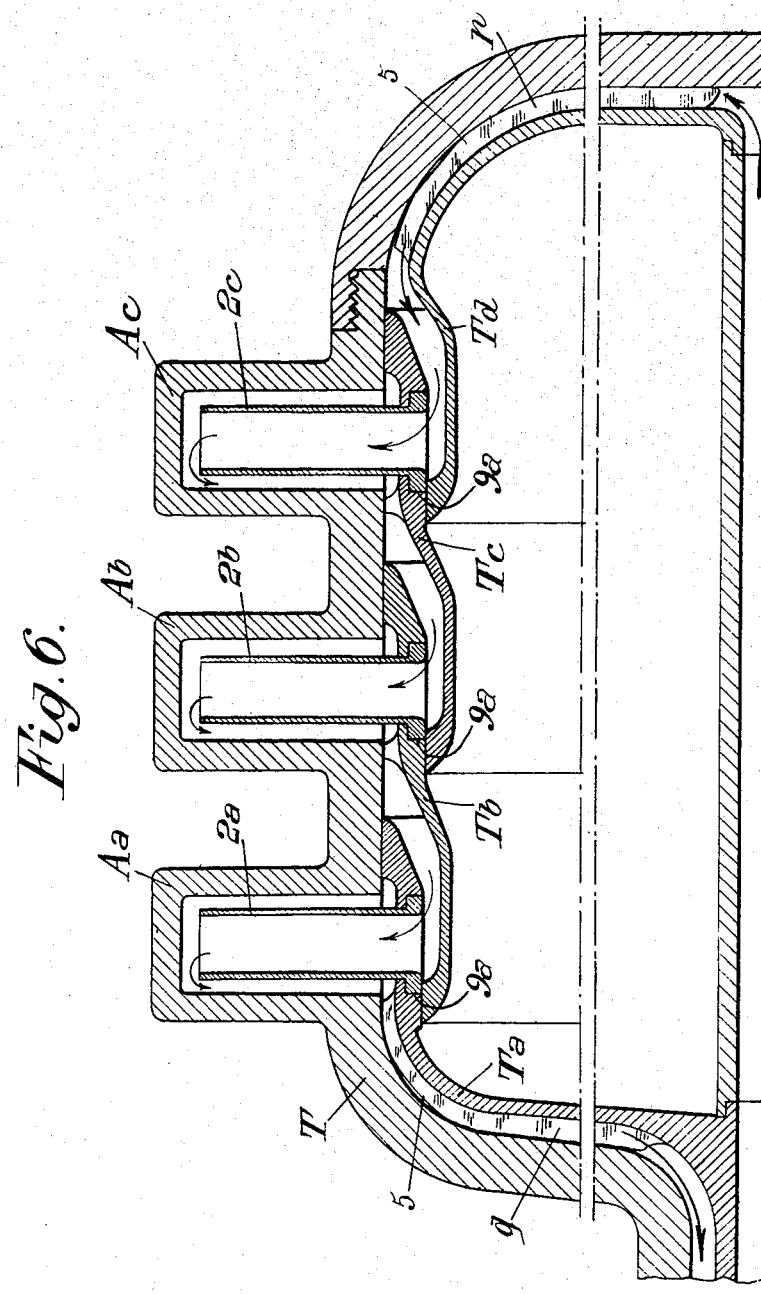

United States Patent Office 2,783,613
Patented Mar. 5, 1957

2,783,613

COOLING SYSTEM EMPLOYING FUEL FOR COOLING THE BLADES OF GAS TURBINE ENGINES

Helmut P. G. A. R. von Zborowski, Paris, France

Application August 18, 1951, Serial No. 242,492

Claims priority, application France January 18, 1951

10 Claims. (Cl. 60—39.66)

The present invention relates to engines, either stationary or movable, including at least one gas turbine and it is more especially concerned with aircraft propulsion engines of this kind and in particular turbo-jets and turbo-props.

Its object is to provide an engine of this kind which is better adapted to meet the requirements of practice than those used up to now and in particular such that the turbine blades are cooled in an efficient and simple manner.

Preferred embodiments of my invention will be hereinafter described with reference to the accompanying drawing, given merely by way of example, and in which:

Fig. 1 is a diagrammatic sectional view of a portion of an engine according to my invention;

Fig. 2 is a corresponding view on an enlarged scale of a portion of the turbine wheel of a modified form of engine;

Fig. 3 is a front view of a portion of said turbine, partly in section on the line III—III of Fig. 2;

Fig. 4 is a cross section of a blade on the line IV—IV of Fig. 2;

Fig. 5 is a view, similar to Fig. 2, of a modification;

Fig. 6 is an axial section of a three stage turbine wheel according to my invention.

The engine shown by way of example, which is for instance an aircraft turbo-jet, is of any suitable general construction, including at least one turbine wheel and at least one combustion chamber C for producing hot gases under pressure which are directed, at the outlet of said chamber, onto the blades A of said turbine.

It is known that the obtainment of blades capable of withstanding the high temperature of the gases flowing out from the combustion chamber constitutes, for this kind of engines, a particularly delicate problem.

The solutions proposed up to this time have never been wholly satisfactory.

According to my invention, the problem is solved as follows:

The turbine blades are hollow and made of a metal which is a good conductor of heat, for instance a light aluminium alloy.

A cooling liquid is caused to circulate through a continuous closed circuit including, in each blade, a centrifugal flow passage $p$ disposed so that the liquid therein is not subjected to the direct heating action of the heated blade wall, and a centripetal flow passage $q$ one wall of which is constituted by the heated wall of said blade.

There is thus produced, between these two passages $p$ and $q$, a difference of temperature which involves a substantial difference between the densities of the liquid volumes present in said respective passages. Owing to this density difference, the centrifugal force exerted in centrifugal passage $p$ is higher than that in centripetal passage $q$ and a flow of liquid takes place in the desired direction, that is to say from centrifugal passage $p$ toward centripetal passage $q$.

In the claims, the chamber which forms passage $q$ is referred to as the first chamber, while the chamber which forms passage $p$ is identified as the second chamber.

Circulation of the cooling liquid is thus obtained without making use of any special pump. This cooling arrangement is of the self regulating type since any increase in the temperature of blades A involves a corresponding increase in the difference between the centrifugal actions in passages $p$ and $q$, and therefore an increase in the speed of circulation of the cooling liquid, the cooling effect varying approximately as the square of said speed of circulation.

For practical purposes, as shown by the drawing, the centrifugal passage $p$ is constituted, at the tip of the blade, by a tube 2 extending radially in the central portion of the blade cavity and open at both ends, the outer end being located at a point radially spaced from the tip of the blade, whereas the centripetal passage $q$ is constituted, in this region of the blade, by the space existing between this tube and the wall of the blade. Thus the centripetal passage constitutes a kind of screen protecting the central centrifugal tube against the heating action of the blade wall.

The turbine wheel in the construction of Figs. 1 to 5, includes two parts $T_1$ and $T_2$ in the form of surfaces of revolution, one of which, $T_1$, partly surrounds the other, an annular space (passage $q$) being left between these two parts for the flow in the centripetal direction of the liquid which has been heated by contact with the wall of blade A. Part $T_2$ which is outwardly flared thus constitutes a partition dividing the inside of the wheel into two chambers which constitute parts of passages $p$, $q$. Passage $q$ includes the outer chamber which communicates with the interior of the blade.

The cooling liquid enters the blade through an axial conduit 1 formed in the inner part $T_2$ of the turbine wheel. It then flows through centrifugal passage $p$, centripetal passage $q$, conduit 3 (branching off from the inner end of said centripetal passage), through a cooling device 4 and back to conduit 1, the details of this circuit being hereinafter set forth.

The turbine blades A may be carried either by the inner part $T_2$ of the turbine wheel, as shown by Fig. 5, or preferably by the external part $T_1$, as shown by the other figures of the drawing. The blades may be either secured to these respective parts of the turbine wheel or integral therewith.

Anyway, the outer part $T_1$ of the turbine wheel is advantageously made of a metal which is a good conductor of heat, for instance a light aluminium alloy, so that heat easily passes to the liquid present in passage $q$, whereas the inner part $T_2$ of the turbine wheel may be made of a metal which is not as good a conductor of heat, such as steel.

Means are provided for increasing the rotary movement of liquid in the portion of passage $p$ which is not constituted by tubes 2 and braking it in passage $q$ in its centripetal path. Such means may be constituted for instance by radial fins 5 as shown in Fig. 1 for both of the passages $p$ and $q$, or again by disposing sufficiently close to each other the walls limiting the passage that is considered (case of passage $q$ in the construction of Fig. 2) so that the frictional forces of the walls have a substantial effect.

The engine may include (Fig. 1), in conventional manner, a compressor A driven by the turbine and furnishing compressed air through pipe P to combustion chamber C, and a reaction nozzle N fed with the gases from chamber C.

According to the preferred embodiment of my invention, illustrated by Figs. 2 and 3, the outer part $T_1$ of the turbine is fitted upon the inner part $T_2$ by means of a flange 6 carried by the outer part $T_1$ and the outer cylindrical face of which is applied against the inner cylindrical face of a flange 7 carried by the inner part $T_2$.

Tubes 2, which are preferably of a flat shaped section corresponding to that of blades A, are merely slipped, from the inside, into radial bores 9 provided in the periphery of the inner part $T_2$ in radial alignment with the respective blades. Every tube is provided, at its inner end, with a holding flange $2a$ engaged in a counterbore $9a$ of larger section provided at the inner end of the corresponding bore 9. Tubes 2 are held by side plate 8 screwed in the inner part $T_2$.

The cooling liquid may consist of water or a mixture of water and methanol. Preferably, according to my invention, this liquid is constituted by the fuel to be used in the engine (fuel oil, kerosene, etc.). In this case, the engine fuel tank 10 is mounted into series in the cooling circuit, preferably between cooling device 4 and conduit 1 and the fuel flows along the axis in conduit 1.

According to another feature of my invention, the cooling liquid, whatever be its nature, is used to cool not only turbine blades A but also parts which are particularly subjected to the action of heat, for instance the walls of combustion chambers C and of their outlet nozzles 11. For this purpose, said walls are provided with liquid jackets providing around said walls an annular chamber 12 through which the cooling liquid is caused to flow, preferably as it is leaving the turbine.

When the cooling liquid is constituted by the engine fuel through pipes $13a$, the engine fuel injectors 13 are supplied with fuel collected from the cooling circuit at 3, i. e. as it has just passed through the turbine wheel.

Thus, I obtain the certainty that passages $p$ and $q$ are filled with liquid when the engine is started, that is to say that blades A do not risk being injured by excessive heating. On the other hand, the fuel is preheated as it enters injectors 13.

According to another feature of my invention, I make use of the fuel circulating in the continuous closed cooling circuit for cooling and lubricating at least one mechanism or bearing of the engine, for instance the turbine bearing 14 as shown by Fig. 1.

For this purpose, the inside of this bearing is placed in series with the cooling circuit and said bearing is provided with suitable sealing means $14a$.

It should be noted that it is because the bearing is very intensively cooled that lubrication by means of the fuel may be considered as sufficient.

Fig. 6 shows a three-stage turbine wheel according to my invention. It includes an outer casing T, having the blades integral therewith and obtained by casting. Inside this outer casing is inserted longitudinally a first inner element $Ta$ provided with holes $9a$ into which can be radially engaged tubes $2a$. A second element $Tb$ is then engaged longitudinally into adjacent relation to $Ta$. This element $Tb$ serves to lock tubes $2a$ in position. Tubes $2b$ are then inserted radially into the holes provided in element $Tb$, and so on. Elements $Tc$, etc., are similar to element $Tb$ and are arranged in series therewith.

It will be readily understood that, in addition to its great simplicity of manufacture, a turbine structure according to my invention is very advantageous in that it ensures an intensive cooling of the blades (and possibly of other elements) without requiring for this purpose the provision of any energy consuming special device. Such a construction is proof against cooling failure and, as above explained, it is self regulating.

Furthermore, the cooling means of my invention are such that the temperature of the gaseous stream fed onto the turbine blades can be chosen as high as it may be necessary for the best possible operation of the engine and of the vehicle (land vehicle or aircraft) on which it is fitted.

It is well known that, in some circumstances (for instance when the aircraft is taking off or during aerial fighting), it is desirable to raise the temperature of this gaseous stream above the temperature used for cruising flight (for instance to about 1300° C. for taking off, as compared to 600° for cruising flying).

This can be easily obtained with the device according to my invention because the efficiency of the cooling system and its self-regulation qualities are such that the temperature of the turbine blades remains practically independent of the temperature of the hot gases.

This advantage is particularly interesting in the case of a supersonic aircraft where, in order to obtain a good result, the thrust must be particularly high for a given transverse cross section of the engine, which implies a high increase of the working temperature.

It is pointed out that, under take-off conditions, when as high an amount of power as possible is to be supplied by the gas turbine, the circumstances are particularly favorable according to my invention, because the fuel tank is then full and a maximum amount of cooling liquid (fuel) is then available to circulate through the cooling fluid circuit. Thus it is possible to obtain from a given gas turbine a power much higher than its normal running power, or, what is tantamount to this, to obtain the desired take-off power with a turbine of relatively light weight. This possibility of reducing the weight of the power plant, always advantageous in an aircraft, is particularly so in the case of an aircraft intended to take off vertically from the ground.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A gas turbine engine which comprises, in combination, a hollow turbine wheel, a partition dividing the inside of said turbine wheel into two chambers adapted to hold a cooling liquid, said partition being substantially in the form of a surface of revolution extending between points located at different distances from the axis of said wheel, a multiplicity of blades carried by said wheel, said blades being hollow and made of a metal which is a good conductor of heat, the inside of each of said blades communicating with a first of said two chambers, a multiplicity of radial tubes, one in each of said blades, extending through said partition to points radially spaced from the tips of said blades, said tubes being open at both ends so as to constitute communicating means between said two chambers, said tubes being out of contact with the inner walls of said blades, the difference in temperature between the liquid in the two chambers causing said liquid to flow from the second wheel chamber into the first wheel chamber by centrifugal force, a continuous closed circuit for the cooling liquid extending partly along the axis of said wheel and including in series the second wheel chamber, said tubes, the space between said tubes and the blade walls and the first wheel chamber, cooling means connected to said circuit whereby liquid from the first wheel chamber is cooled before being returned to the second wheel chamber, means in both of said chambers for urging the mass of liquid present in said chambers to rotate with a speed of revolution at least approximating that of said wheel, said last means being operatively connected to said wheel for rotation therewith.

2. An engine according to claim 1 in which said last mentioned means are constituted by radial fins located inside said chambers.

3. An engine according to claim 1 in which said tubes are flattened to correspond to the shape of said blades respectively.

4. An engine according to claim 1 in which said wheel includes at least two parts assembled together, said partition constituting one wall of one of said parts.

5. An engine according to claim 1 including at least one combustion chamber, means for directing hot gases from said chamber onto said blades, and a fuel tank, said circuit including the fuel tank whereby the fuel is used as the cooling liquid, and means to supply fuel from said circuit to said combustion chamber.

6. An engine according to claim 1 including at least one combustion chamber, a nozzle for conveying the hot gases from said chamber onto said blades, a cooling jacket surrounding said nozzle, a fuel injector opening into said combustion chamber, a fuel tank, said circuit including the inside of said jacket and said fuel tank, whereby said cooling liquid is constituted by the fuel from said tank, and means to supply fuel from said circuit to said fuel injector.

7. In an engine according to claim 6, said fuel supply means being connected to a point in said circuit on the downstream side from said blades.

8. An engine according to claim 1 including at least one combustion chamber, means for directing hot gases from said chamber onto said blades, a cooling passage in said directing means, said cooling circuit including said cooling passage.

9. An engine according to claim 1 including at least one combustion chamber, means for conveying hot gases from said combustion chamber onto said blades including a nozzle, and a cooling jacket surrounding said nozzle, said circuit including the inside of said cooling jacket.

10. A gas turbine engine which comprises, in combination, a hollow turbine wheel, comprising an outer member including first and second end walls in the form of bodies of revolution about the axis of said wheel and a side wall extending between the outer peripheries of said end walls, said side wall having first and second annularly arranged sets of hollow projections therefrom forming hollow turbine blades, first and second partitions forming inside said turbine wheel first and second annular chambers respectively along the inside faces of said end walls for circulation of a cooling liquid, said paritions being substantially in the form of surfaces of revolution about said axis and extending short distances from said end walls, said outer member being made of a metal which is a good conductor of heat, the first partition having a peripheral portion parallel to the portion of said outer member which comprises the first set of said blades to be struck by the power gases and being joined to the inner face of the side wall of said outer member between said first and second sets of blades, the inside of each of the blades of said first set communicating with said first chamber, said peripheral portion of said first partition having a first set of holes therein opposite each of the blades of said first set, a first group of radial tubes mounted in said first holes and extending through said first partition at points radially spaced from the tips of said first blades, said first tubes being open at both ends, said first tubes being out of contact with the inner walls of said first blades, a first ring within said outer member and partly within said peripheral portion of said first partition said first ring having a portion engaging said peripheral portion of said first partition and said first tubes to hold said tubes in said holes while leaving a first free annular space between the inner end of said tubes and said ring, said first ring extending from the circular line along which it is in fluidtight contact with said peripheral portion of said first partition to a second circular line where it is in fluidtight contact with the inner face of the side wall of said outer member, and second line being located on the other side of the second set of blades from the first set, the inside of each of the blades of said second set communicating with said first annular space, said second ring having a second set of holes therein opposite each of the blades of said second set, a second group of radial tubes mounted in said second set of holes and extending through said second ring to points radially spaced from the tips of said second blades, said second tubes being open at both ends and being out of contact with the inner walls of said blades of the second set, a second ring with said outer member and within the portion of said first ring which is provided with said holes so as to form a second annular space into which open the inner ends of said second tubes, said second ring engaging said second tubes to hold them in said second holes, said second ring being joined to the inner wall of said first ring along a third circular line located between said first and second groups of tubes, means along the inner face of said side wall of said outer member forming a communication between the periphery of the second annular chamber and said second annular space, whereby a continuous circuit for circulation of the cooling liquid is provided in said wheel, said circuit including the following portions stated in the order in which said cooling liquid circulates therethrough, to wit, said second mentioned annular chamber through which the cooling fluid flows centrifugally from its central inlet to its periphery, said means forming a communication between the periphery of said second annular chamber and said second annular space, the inside of said second tubes, the spaces between said second tubes and the inner walls of the blades of said second set, said first annular space, the inside of said first tubes, the spaces between said first tubes and the inner walls of the blades of said first set, and said first annular chamber through which the cooling liquid flows centripetally toward the central outlet thereof, the differences in temperature between the liquid portions flowing in said tubes and the corresponding liquid portions flowing between said tube and the inner walls of said blades causing the cooling liquid to circulate through said circuit, and means in said annular chambers for urging the cooling liquid masses present therein to rotate with a speed of revolution at least approximating that of said wheel, said last mentioned means being operatively connected to said wheel for rotation therewith, and cooling means connected to said circuit between the central outlet of said second annular chamber and the central inlet of said first annular chamber, whereby liquid from the first annular chamber is cooled before being returned to said second annular chamber.

References Cited in the file of this patent

UNITED STATES PATENTS

| 2,369,795 | Planiol et al. | Feb. 20, 1945 |
| 2,413,225 | Griffith | Dec. 24, 1946 |
| 2,463,851 | Browne | Mar. 8, 1949 |
| 2,633,327 | McDowell | Mar. 31, 1953 |
| 2,636,344 | Heath | Apr. 28, 1953 |

FOREIGN PATENTS

| 167,556 | Austria | Jan. 25, 1951 |
| 824,013 | France | Oct. 25, 1937 |
| 420,781 | Germany | Oct. 31, 1925 |
| 195,736 | Switzerland | July 16, 1938 |
| 237,475 | Switzerland | Sept. 1, 1945 |